United States Patent [19]

Henry et al.

[11] Patent Number: 4,840,437
[45] Date of Patent: Jun. 20, 1989

[54] DYNAMIC TRACK TENSIONING SYSTEM FOR TRACKED VEHICLES

[75] Inventors: Samuel B. Henry, Royal Oak; James J. Kuhns, Romeo, both of Mich.

[73] Assignee: Cadillac Gage Textron Inc., Warren, Mich.

[21] Appl. No.: 168,382

[22] Filed: Mar. 15, 1988

[51] Int. Cl.⁴ .............................. B62D 55/30
[52] U.S. Cl. ............................ 305/10; 305/31
[58] Field of Search ........... 305/10, 29, 31, 32; 180/6.54, 6.7, 9.1, 9.44

[56] References Cited

U.S. PATENT DOCUMENTS

| | | | |
|---|---|---|---|
| 3,310,127 | 3/1967 | Siber et al. | 305/10 X |
| 3,511,327 | 5/1970 | Schlor | 180/6.7 |
| 3,625,303 | 12/1971 | Cameron | 180/9.1 X |
| 3,972,569 | 8/1976 | Bricknell | 305/10 |
| 4,279,318 | 7/1981 | Meisel, Jr. | 305/10 X |
| 4,458,954 | 7/1984 | Haas | 305/32 X |
| 4,513,833 | 4/1985 | Sheldon | 180/9.1 |
| 4,545,624 | 10/1985 | Van Ooyen | 305/31 X |

FOREIGN PATENT DOCUMENTS

| | | | |
|---|---|---|---|
| 8204022 | 11/1982 | PCT Int'l Appl. | 305/10 |
| 0800007 | 1/1981 | U.S.S.R. | 305/10 |
| 0950580 | 8/1982 | U.S.S.R. | 305/10 |

Primary Examiner—Russell D. Stormer
Attorney, Agent, or Firm—John C. Evans

[57] ABSTRACT

The tracks of a tracked vehicle are subject to a tension control system which includes a movable idler wheel for applying force to each track, a hydraulic actuator for dynamically applying force to each track at a zero spring rate, a pilot controlled check valve for selectively locking the actuator against tension relieving return movement, and a control sensitive to vehicle steering, direction of movement, acceleration and deceleration for deciding according to a preset program whether each actuator should be locked or free to move. An operator controlled switch modifies system hydraulic pressure to permit an optional low pressure operation.

11 Claims, 3 Drawing Sheets

U.S. Patent Jun. 20, 1989 4,840,437
FIG 1
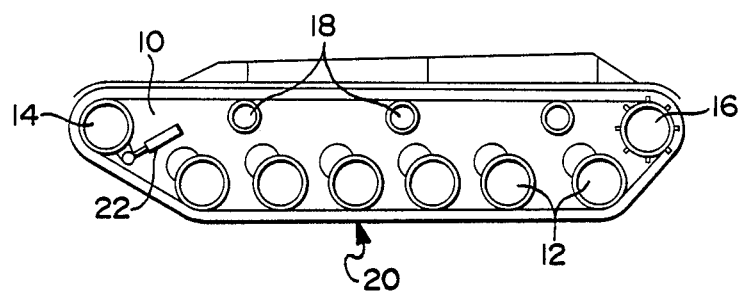
FIG 2
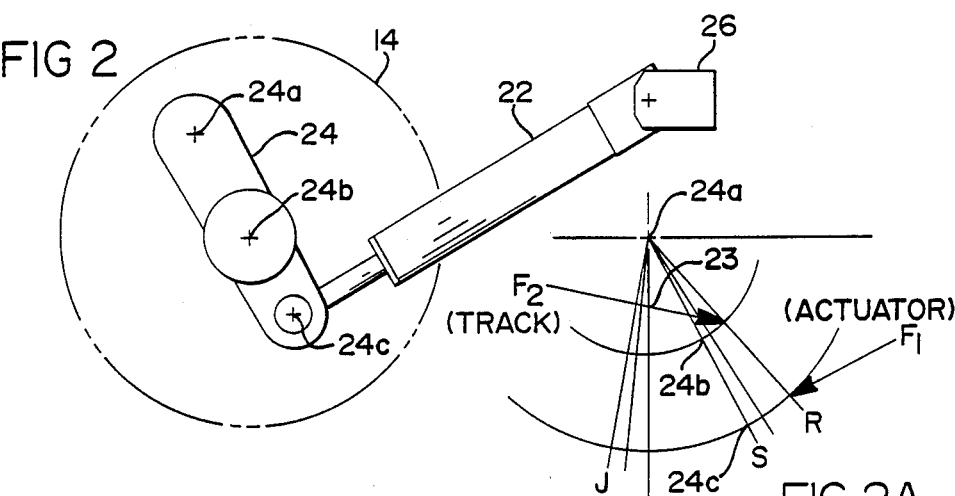
FIG 2A
FIG 3
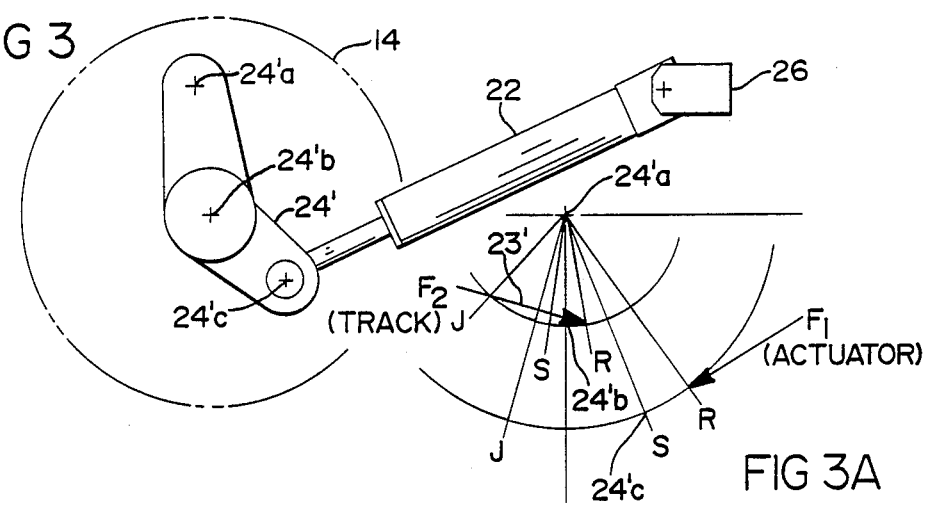
FIG 3A

DYNAMIC TRACK TENSIONING SYSTEM FOR TRACKED VEHICLES

FIELD OF THE INVENTION

This invention relates to a dynamic system for track tensioning on tracked vehicles and particularly to a hydraulically controlled track tensioner dynamically responsive to vehicle conditions.

BACKGROUND OF THE INVENTION

In a tracked vehicle, especially a tank or the like which is subject to rough terrain and severe operating conditions, the track and wheel dynamics cause widely fluctuating track tension. Typically an idler wheel is provided to adjust tension but prior arrangements are limited in ability to control the tension. An ideal system would maintain, for all mobility scenarios, a track tension which is relatively uniform and of the lowest possible magnitude which provides proper guiding of the track throughout its entire path. Such an ideal system would maximize track and running gear life; aid in minimizing rolling resistance, which would improve drive train efficiency; assure a high level of mobility during aggressive and/or high speed maneuvering situations; and, in general, enhance the combat readiness, reliability, and maintenance characteristics of the vehicle over its life cycle.

Prior to this invention the track tensioning systems could be grouped into two basic types: fixed idler systems and movable idler systems. The fixed idler systems have an idler wheel initially adjusted for a desired static tension. The idler is then rigidly anchored to the hull. The movable idler systems have a track tensioning idler wheel connected to the forward road arm through a link whose length can be adjusted for a desired static tension. The geometry of the linkage is arranged so that as the road arm approaches its jounce, or uppermost, position the tensioning idler is moved forward. This motion attempts to maintain a uniform total periphery about all track-contacting elements; i.e. the road wheels, final drive sprocket, return rollers, and tensioning idler.

The tracks, of course, may operate in either a driving or a braking mode. In driving mode, the track is driven by the drive sprocket and applies a tractive effort to the ground which maintains or increases the track velocity. In braking mode the opposite occurs to decrease the track velocity. The tension in a given section of track varies greatly as the track moves around the drive sprocket, the tension being greater on the side of the sprocket nearest the road wheels when in driving mode and less during braking mode. Reverse travel and turning changes the tension conditions on one or both tracks. The negotiation of an obstacle at high speed accentuates the difference in tensions. Thus the tensions can vary widely and rapidly, if not controlled, and the wheels are affected as well.

For example, when the vehicle is traveling forward with both tracks driving, the rear wheels tend to compress to a degree dependent on the tractive effort. This reduces the total periphery of the track supporting members allowing the track to loosen and partially disengage from the tensioning idler. This condition can produce a thrown track if the vehicle should suddenly encounter an obstacle or attempt an abrupt steer maneuver.

SUMMARY OF THE INVENTION

It is therefore an object of the invention to provide a track tension control system for improving the uniformity of tension. It is another object to provide such a system for maintaining the tension at the lowest value suitable for the vehicle operating conditions.

The invention is carried out by a dynamic track tension system for a tracked vehicle comprising; means for detecting vehicle conditions and producing condition signals, hydraulic control means responsive to the condition signals for developing variable hydraulic pressure for each track in accordance with the vehicle conditions, and a hydraulic track adjuster for each track coupled to and operated by the hydraulic pressure for applying controlled tension to each track according to the detected vehicle conditions.

More specifically the invention comprehends a movable track idler wheel positioned hydraulically under a selected hydraulic pressure and responsive to the detected vehicle conditions to selectively maintain a set position of the idler wheel or allow movement of the wheel under the hydraulic force.

BRIEF DESCRIPTION OF THE DRAWINGS

The above and other advantages of the invention will become more apparent from the following description taken in conjunction with the accompanying drawings wherein like references refer to like parts and wherein:

FIG. 1 is an elevation of a tracked vehicle having a dynamically adjustable track tension idler wheel according to the invention;

FIGS. 2 and 3 are schematic illustrations of two different mounting geometries for the idler wheel of FIG. 1;

FIGS. 2A and 3A are force diagrams for the geometries of FIGS. 2 and 3, respectively.

DESCRIPTION OF THE PREFERRED EMBODIMENT

Figure 4:
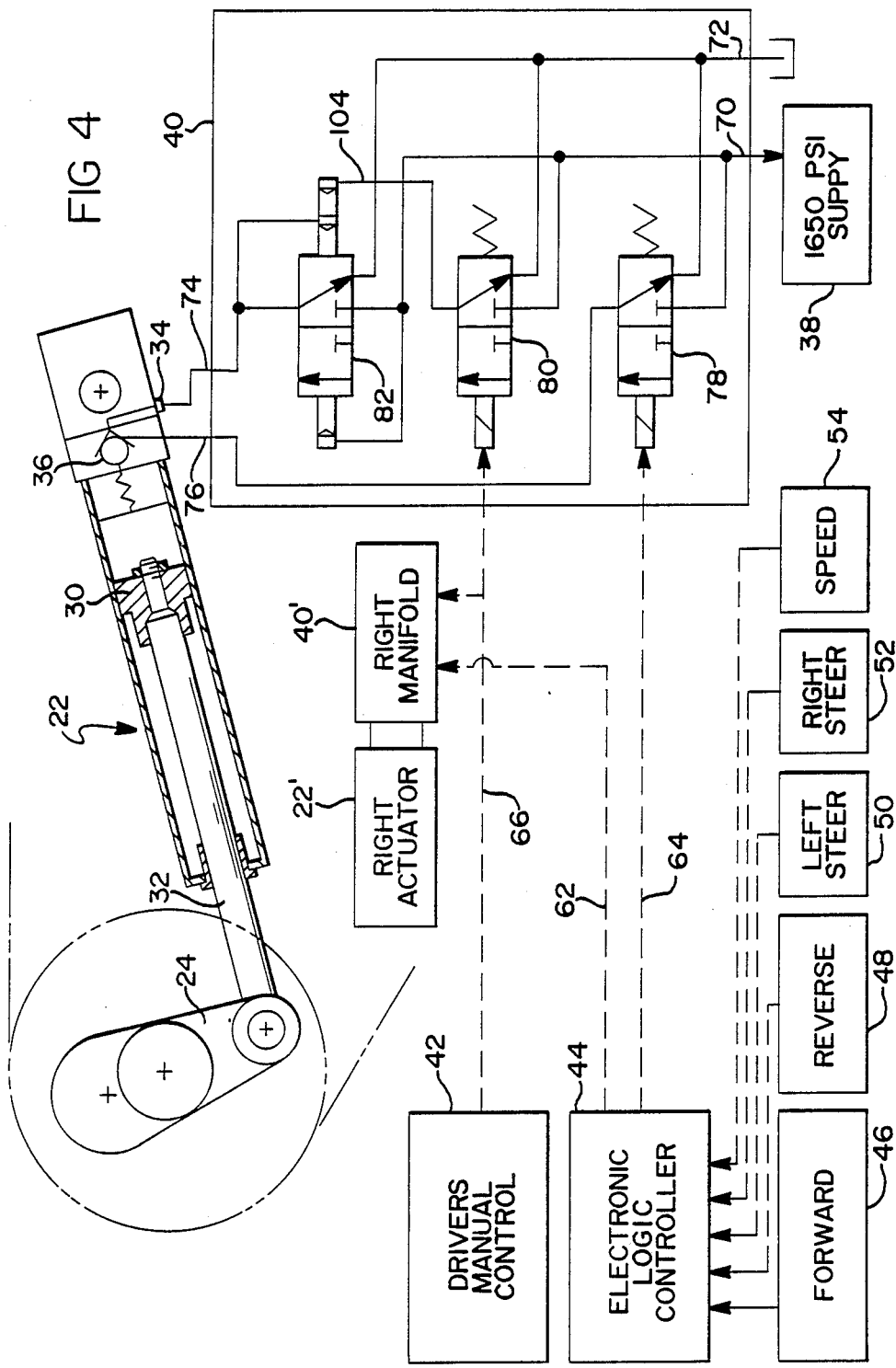
FIG. 4 is a schematic diagram of the control system and a cross section of the idler wheel actuator according to the invention.

FIG. 1 shows a tracked vehicle such as a tank or the like having a hull 10 supporting a plurality of road wheels 12, a forward idler tension wheel 14, a drive sprocket 16, a few upper idler wheels 18, and a track 20 extending around and mounted on the elements 12 through 18. The road wheels 12 are mounted on conventional suspensions allowing arcuate movement in response to vertical forces from their normal static position to a fully compressed jounce position at one extreme to a fully extended or rebound position at the other extreme. Variations in track path length caused by such movement of the road wheels is accommodated by the idler wheel 14 which is adjustable on a moment by moment basis to maintain a more uniform tension than can be obtained by the previous systems. A hydraulic actuator 22 controls the position of the idler wheel 14.

To permit adjustment, as shown in FIG. 2, the idler wheel 14 is rotatably mounted at 24b on an idler arm 24 near the upper and lower ends of the arm. The upper arm end is pivoted to the hull 10 at 24a and the lower end of the arm 24 is pivotally coupled to one end of the actuator 22 at 24c. The other end of the actuator is mounted to a trunnion 26 on the hull 10. The idler arm 24 is the same as that sometimes used with a tensioning link instead of an actuator. The tensioning link is adjustable in length only as a maintenance procedure and has a fixed length during tank operation. Thus the hydraulic actuator 22 can be incorporated in vehicles of the illustrated design without change of the idler wheel mounting arrangement. When the actuator is thus used, along with the control to be described, improvements in track tension uniformity can be realized. In the case of the illustrated design, the force vector resulting from track tension is identified in FIG. 2A by reference numeral 23. In another embodiment, the idler arm is bent and the center of the idler wheel is moved forward a few inches, as shown in FIG. 3. Such arrangement improves tension uniformity on the track 20 with force variations from the static height to the extreme limits being on the order of five or six percent. The bent idler arm 24' then takes the form of a bell crank with a hull pivot 24'a, an idler wheel center 24'b and an actuator pivot 24'c.

In such case, the force vector 23' is very near perpendicular to the idler arm 24' throughout its stroke and the compensating tension moment is near equal and opposite to the force vector movement. Force diagrams of each embodiment are shown in FIGS. 2A and 3A respectively.

In FIG. 2A, the arc of the idle wheel center is shown at 24a,b and the arc of the actuator pivot is shown at 24c. The jounce, static and rebound positions are marked J, S and R.

In FIG. 3A the arc of the bent idler arm 24' includes an idler wheel center arc 24'b and an actuator pivot arc 24'c. Comparison of the arcs (and associated force vectors) confirms the more uniform tensioning produced by the FIG. 3 case.

The actuator 22, as best shown in FIG. 4, is a single acting linear hydraulic actuator having a piston 30 driving a piston rod 32 which connects to the idler arm 24. If desired the piston rod length can be adjustable using a known technique (not shown) of a secondary cylinder and piston preloaded with a pressurized grease to extend the length to a desired amount. A hydraulic fluid inlet 34 on the side of the piston opposite the piston rod 32 admits fluid under pressure so that the actuator 22 can only exert force on the idler in a direction to increase track tension. A pilot operated check valve 36 in the inlet 34 has a normal closed position to prevent flow from the actuator and an open position when pilot pressure is applied to permit bidirectional flow. In closed position, the valve 36 maintains the actuator position against the forces exerted by the track 20 on the idler wheel 14 and also protects the remainder of the hydraulic system from the large hydrostatic pressures which may be generated within the actuator.

The pressure is supplied to the actuator 22 from a suitable hydraulic supply 38 through a manifold 40 which regulates the applied pressure as well as the pilot pressure. The actuator 22 and hydraulic manifold 40 serve the left side of the vehicle while an identical actuator 22' and manifold 40', shown as blocks, serve the right side of the vehicle. Electrical controls for setting both the right and left manifold pressures include a drivers manual control 42 and an electronic logic controller 44. Several sensors monitor vehicle operating conditions (or vehicle condition parameters which are processed to produce vehicle control parameters) or commands to provide information to the logic controller 44.

The sensors provide information about three mutually exclusive pairs of vehicle conditions: right and left steer, forward and reverse travel, and acceleration and deceleration. The blocks forward 46 and reverse 48 represent the source of information on that pair of conditions. Where the vehicle transmission is electrically shifted the shift command can be tapped to yield that information. The blocks left steer 50 and right steer 52 represent the source of that information and is implemented by a cam actuated dual switch assembly added to the driver's steering tiller bar to detect displacement from center which represents a steering command. The block representing speed 54 is an existing device providing the vehicle speedometer input. In one proposal, the speed sensor is a digital magnetic speed pickup measuring the transmission output. Its output is fed to the vehicle speedometer and is used as the speed signal. However, other speed sensors are equally suitable for practicing the invention. The speed signal is utilized by the electronic logic controller 44 to determine acceleration and deceleration.

Figure 5:
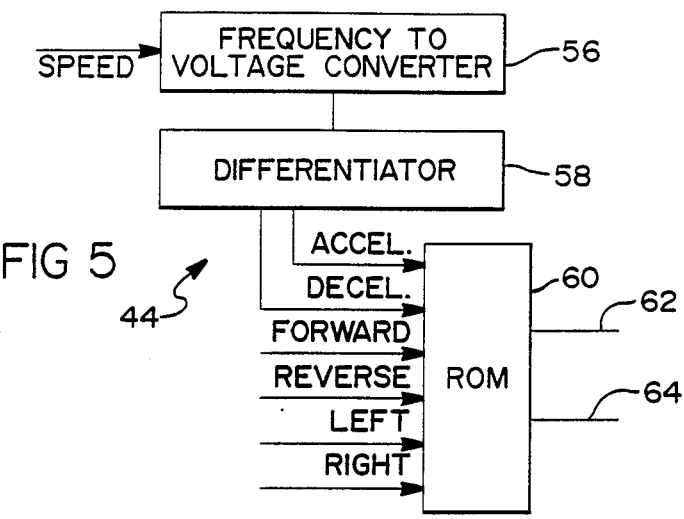
FIG. 5 is a block diagram of a logic controller of the control system of FIG. 4.

The logic controller 44, as shown in FIG. 5, includes two major sections. The first section receives the digital speed signal and includes a frequency to voltage converter 56 to output an analog speed voltage, and a differentiator 58 for determining acceleration or deceleration and yielding corresponding logic signals for those two conditions. The second section comprises a ROM 60 having a lookup table programmed to output suitable control signals on lines 62 and 64 which couple to the right and left manifolds 40' and 40, respectively. The inputs to the ROM 60 are the acceleration and deceleration signals as well as the forward, reverse, left steer and right steer signals. The following table exemplifies the ROM logic. For each operating condition a decision is made for the right and left actuators whether the pilot operated check valve should be open (0) or closed (C) and the logic level of the signal on lines 62 and 64 convey that information to the manifolds 40 and 40'.

| Vehicle Operational Mode | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
|---|---|---|---|---|---|---|---|---|---|---|---|---|---|---|---|---|---|---|---|---|---|---|---|---|---|---|---|
| Sensor Indication | | | | | | | | | | | | | | | | | | | | | | | | | | | |
| Vehicle Accelerating | | | X | | X | | X | | X | | X | | X | | X | | X | X | | | | | | | | | X |
| Vehicle Decelerating | | | | X | | X | | X | | X | | X | | X | | X | | | X | | X | X | | X | | | |
| Transmission in Forward | X | X | X | | | | X | X | X | X | X | X | | | | | | | | | | | | | | | |
| Transmission in Reverse | | | | X | X | X | | | | | | | X | X | X | X | X | X | | | | | | | | | |
| Left Steer Engaged | | | | | | | | | | X | X | X | | | | X | X | X | | X | | X | | X | | | |

| Vehicle Operational Mode | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
|---|---|---|---|---|---|---|---|---|---|---|---|---|---|---|---|---|---|---|---|---|---|---|---|---|---|---|---|
| Right Steer Engaged | | | | | | | | X | X | X | | | | X | X | X | | | | X | | X | | X | | | |
| *Condition of Actuator Pilot Check Valves | | | | | | | | | | | | | | | | | | | | | | | | | | | |
| Left Track | O | O | O | C | O | C | O | O | O | C | C | C | C | O | C | O | O | O | O | O | C | C | C | O | C | O | O |
| Right Track | O | O | O | C | O | C | O | C | C | C | O | O | C | O | O | O | O | C | O | C | O | C | O | C | C | O | O |

*With valve open (O), actuator operates as zero rate spring.
With valve closed (C), actuator is hydrostatically locked in position.

The driver's manual control also sends a logic level signal to the manifolds 40 and 40' on line 66. The control 42 is simply a switch controlled by the driver to signal the manifolds to decrease the pressure to the actuators whenever the driver judges that the expected operating conditions will require no abrupt maneuvers. In those conditions the resulting lower track tension improves track life and vehicle operating efficiency.

Figure 6:
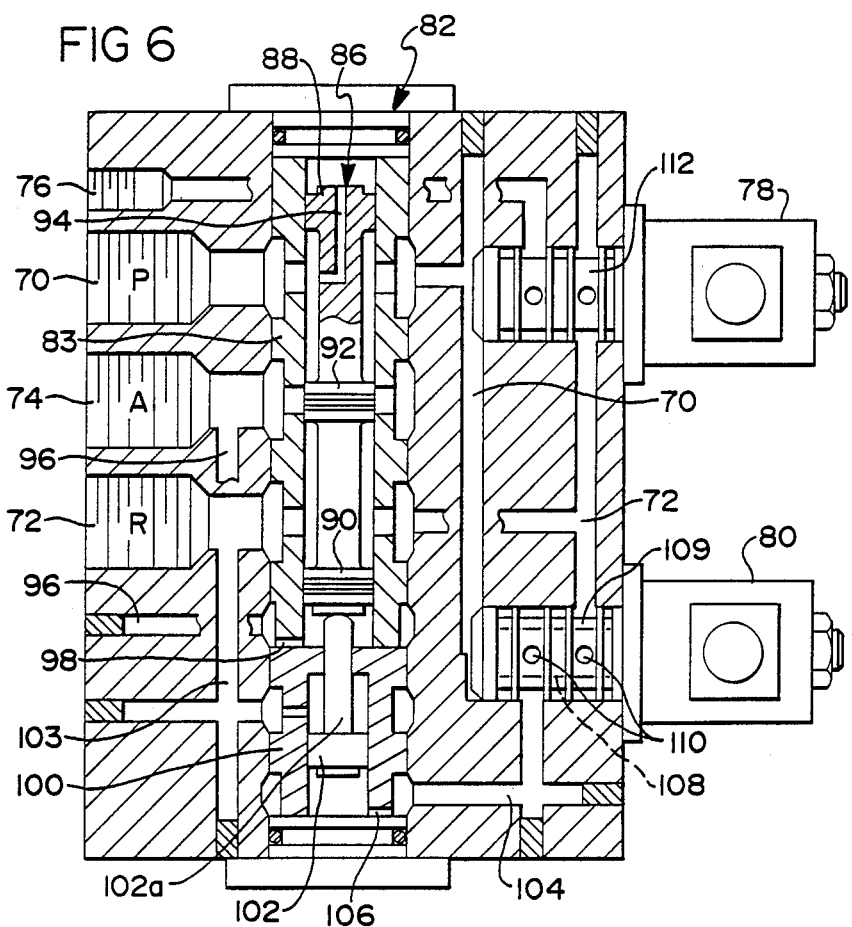
FIG. 6 is a cross sectional elevation of a control valve manifold for the system of FIG. 4.

The manifold 40 depicted in FIGS. 4 and 6 has a supply input port 70 connected to the supply 38, a return port 72 connected to the system sump, an actuator port 74 coupled to the actuator 22 and a pilot pressure port 76 coupled to the check valve 36 of the corresponding actuator. The control line 64 is coupled to a solenoid valve 78 and the control line 66 is connected to a solenoid valve 80.

A pressure regulating valve 82 comprises a main bore in the manifold having a long ported sleeve 83 at one end containing a spool 86 with end lands 88 and 90 and a central land 92. The center land 92 separates the supply port 70 from the return port 72 and regulates the output to the actuator port 74. A restricted passage 94 in the spool couples the supply pressure to the top end of the spool 86. The output pressure at port 74 is coupled to the bottom end of the spool through an internal passage 96 and a port 98 in the sleeve 83 to normally maintain the output pressure at the supply pressure. The control for a second, reduced pressure comprises a second sleeve 100 in the main bore at the bottom end of the sleeve 83 and having a smaller internal diameter. A piston 102 in the second sleeve 100 bears against the bottom end of the spool 86 so that if supply pressure is applied to the bottom end of the piston the force on the top end of the spool will be partially offset to reduce the regulated pressure at the output port 74. The pressure is selectively applied to the piston 102 by the solenoid valve 80 through the passage 104 and aperture 106. The solenoid valve 80 positions a spool 108 in sleeve 109 to apply return or zero pressure to passage 104 via internal porting 110 when the solenoid is deenergized. When voltage is applied to the solenoid the spool is displaced to couple the supply pressure to the passage 104 and to the bottom of the piston 102. The solenoid valve 78 is identical to valve 80 and is connected to internal passages to normally couple the pilot pressure port 76 to the return or zero pressure. When energized, the spool 112 of that valve 78 is displaced to couple the supply pressure to the pilot port 76.

As shown, a step 102a is provided in piston 102 and passage 103 connects the system return to the reduced area at the top end of piston 102.

It will thus be seen that the control system enables the operator to select full pressure or reduced pressure, as required for optimum track tension. It is also feasible to modify the system to allow for another pressure level also selectable by the operator.

It is also evident that the tension control by the hydraulic actuator provides for a hydrostatic lock preventing idler retraction when such retraction would make the track loose and vulnerable to being thrown off. When that danger is absent the actuators act as zero rate springs to apply uniform force to the tracks. The decision of which mode is appropriate for each track is encoded into the ROM in accordance with the above table. According to the table when the vehicle is moving straight forward and accelerating, the check valve would be open for both tracks and the idler wheels would experience a constant spring force from the actuators. If, however, the brakes are applied and deceleration is sensed, both check valves are closed and the idler wheels will be prevented from retracting. In the case of steering it frequently occurs that one valve will be open and the other will be closed.

It should be apparent that the dynamic track tension system according to the invention is effective to improve tension uniformity and reduce the tension to a minimum value under appropriate operating conditions.

The embodiments of the invention in which an exclusive property or privilege is claimed are defined as follows:

1. In tracked vehicle having tracks subject to variable tension, a dynamic track tension system comprising:
    a source of hydraulic pressure;
    condition detecting means for detecting vehicle conditions for and producing control signals in accordance with the vehicle conditions;
    hydraulic control means including pilot valve means selectively operable to allow bidirectional flow or unidirectional flow with respect to said source, said hydraulic control means producing a control pressure; and
    a pressurizable hydraulic track adjuster means for controlling the tension in each track, said pressurizable hydraulic track adjuster means coupled to the hydraulic pressure source by said hydraulic control means and having pressure therein established by said hydraulic control means in response to said control signals for conditioning said hydraulic control means to vary the pressure in said hydraulic track adjuster means for applying a variable tension to each track according to the detected vehicle conditions.

2. The invention as defined in claim 1 wherein the condition detecting means senses vehicle movement.

3. The invention as defined in claim 1 wherein the condition detecting means includes first means for detecting vehicle acceleration or deceleration and second means for sensing right and left vehicle steer.

4. The invention as defined in claim 1 wherein the hydraulic track adjuster comprises an idler wheel movable in a predetermined path and a hydraulic actuator subject to the control pressure for positioning the idler wheel against the track to produce track tension appropriate for the detected vehicle conditions.

5. The invention as defined in claim 4 wherein the hydraulic actuator operates in two modes selectable by the control signal, said pilot valve means operable in response to the control signal to enable one mode for allowing bidirectional flow of hydraulic fluid to and from said actuator under constant pressure and said pilot valve means operable in response to the control signal to produce the other mode for allowing flow to said actuator for urging the idler wheel against the track and preventing idler wheel movement in the other direction.

6. The invention as defined in claim 4 wherein the control means includes means for varying the hydraulic pressure supplied to the actuator, thereby allowing selection of optimum track tension for the operating conditions.

7. In a tracked vehicle having tracks subject to varying tension under various operating conditions, a system adaptive to the operating conditions for adjusting the track system tension comprising:
a source of hydraulic pressure;
an idler tension wheel for each track supported on the vehicle at a first pivot point, means including an idler arm having one end thereof supported on the vehicle at a second pivot point and having an opposite end thereon located below each of said first and second pivot points and movable to position said idler tension wheel against the track to impose a tension on the track;
a hydraulic actuator coupled to the source of hydraulic pressure and connected between the vehicle and said opposite end for positioning the wheel to control the tension in the track;
means for sensing a plurality of vehicle conditions and for producing a control signal; and
control means responsive to the control signal for supplying hydraulic pressure to said hydraulic actuator and controlling the actuator operation so that the wheel position for each track is dependent on the vehicle conditions and varies as the conditions vary.

8. The invention as defined in claim 7 wherein the control means includes:
logic means for interpreting the vehicle conditions and operative to produce control signals;
means including first and second spool valves for controlling pressure level to the actuator and means including a pilot valve for controlling hydraulic flow to and from the actuator.

9. The invention as defined in claim 7 wherein said control means includes pressure supplying means for pressurizing said actuator to increase pressure therein so as to increase track tension and a pilot operated valve controlled in response to said vehicle conditions for selectively locking said hydraulic actuator and for unlocking said hydraulic actuator and allowing movement thereof under pressure levels established by said control means.

10. The invention as defined in claim 9 including manual pressure selection means wherein the pressure in said actuator is variable to allow higher track tension under first operating conditions and lower tension under second conditions.

11. The invention as defined in claim 9 wherein the vehicle conditions include vehicle acceleration, braking and steering conditions, and the control responds to the conditions according to a predefined logic to selectively maintain bidirectional flow or unidirectional flow through the pilot operated to suit the tension control of each track to the conditions.

* * * * *